United States Patent
Javali et al.

(10) Patent No.: US 9,860,195 B2
(45) Date of Patent: Jan. 2, 2018

(54) METHOD AND SYSTEM OF PROVIDING CARRIER GRADE NAT (CGN) TO A SUBSET OF A SUBSCRIBER BASE

(71) Applicant: Hughes Network Systems, LLC, Germantown, MD (US)

(72) Inventors: Nagesh Javali, Germantown, MD (US); Ramakrishnan Jayant, Germantown, MD (US); Rob Torres, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 98 days.

(21) Appl. No.: 14/986,583

(22) Filed: Dec. 31, 2015

(65) Prior Publication Data
US 2017/0195256 A1 Jul. 6, 2017

(51) Int. Cl.
H04L 12/28 (2006.01)
H04L 12/947 (2013.01)
H04L 29/12 (2006.01)

(52) U.S. Cl.
CPC .......... *H04L 49/25* (2013.01); *H04L 61/1511* (2013.01); *H04L 61/6068* (2013.01); *H04L 61/6095* (2013.01)

(58) Field of Classification Search
CPC ............. H04L 61/1511; H04L 61/6068; H04L 61/6095
USPC ......................................................... 370/392
See application file for complete search history.

(56) References Cited

U.S. PATENT DOCUMENTS

| | | | |
|---|---|---|---|
| 8,230,071 B1 * | 7/2012 | Quilter ................ | H04L 61/2592 709/223 |
| 2003/0001883 A1 | 1/2003 | Wang | |
| 2004/0193730 A1 * | 9/2004 | Vernon ............... | H04L 12/4633 709/245 |

(Continued)

FOREIGN PATENT DOCUMENTS

WO    2012/056010 A1    5/2012

OTHER PUBLICATIONS

International Search Report dated Mar. 27, 2017 issued in corresponding International Application No. PCT/US2016/068403.

(Continued)

*Primary Examiner* — Farah Faroul
(74) *Attorney, Agent, or Firm* — Nath, Goldberg & Meyer; Leonid D. Thenor (57) ABSTRACT

A method and system are disclosed for providing a service to bypass carrier grade network address translation (NAT), or CGN. A first and second range of private IPv4 addresses are generated for mapping to public IPv4 addresses. Subscribers to the service are provided terminals with a status code which indicates its status with respect to the service. The terminal is assigned a private internet protocol (IP) subnet within the first range of private IPv4 addresses, if the status code is indicative of a bypass status and the terminal identifies a bypass device that requires access to inbound traffic from the public network. Each bypass device is assigned a private IPv4 address from the first range, and the bypass device's private IPv4 address is mapped to a public IPv4 address. Inbound traffic having a matching public IPv4 destination address is subsequently directed to the bypass device.

20 Claims, 6 Drawing Sheets

(56) References Cited

U.S. PATENT DOCUMENTS

| | | | |
|---|---|---|---|
| 2008/0062997 A1* | 3/2008 | Nix | H04L 29/12066 370/395.2 |
| 2008/0186985 A1* | 8/2008 | Sheth | H04L 45/00 370/401 |
| 2009/0040944 A1 | 2/2009 | Yu et al. | |
| 2009/0254990 A1* | 10/2009 | McGee | G06F 21/51 726/22 |
| 2010/0217837 A1 | 8/2010 | Ansari et al. | |
| 2013/0067110 A1* | 3/2013 | Sarawat | H04L 61/2517 709/238 |
| 2013/0304927 A1* | 11/2013 | Abu-Amara | H04L 61/1511 709/227 |
| 2013/0340050 A1* | 12/2013 | Harrison | H04L 63/10 726/4 |
| 2013/0346620 A1 | 12/2013 | Gizis et al. | |
| 2016/0072766 A1* | 3/2016 | Jain | H04L 61/2567 709/228 |
| 2016/0080316 A1* | 3/2016 | Gonzalez Pizarro | H04L 61/2507 709/245 |
| 2016/0308981 A1* | 10/2016 | Cortes Gomez | H04L 67/16 |

OTHER PUBLICATIONS

Written Opinion of the International Searching Authority dated Mar. 27, 2017 issued in corresponding International Application No. PCT/US2016/068403.
Rekhter, et al., Address Allocation for Private Internets, Feb. 1996.
Belimpasakis, Remote Access to Home Services Utilizing Dynamic DNS and Web Technologies, Tampere University of Technology, Jun. 7, 2016.

* cited by examiner

METHOD AND SYSTEM OF PROVIDING CARRIER GRADE NAT (CGN) TO A SUBSET OF A SUBSCRIBER BASE

BACKGROUND INFORMATION

The explosive growth of the internet and slow progress in fully deploying internet protocol version 6 (IPv6) addressing has resulted in a challenge for a number of internet service providers (ISP). Many legacy and newer devices are only capable of supporting IPv4 addressing, despite exhaustion of such addresses since 2011. Consequently, ISPs are often required to provide service to a large number of customers by sharing only a limited number of allocated or available public IPv4 addresses. The exhaustion of IPv4 addresses has resulted in difficulties for ISPs to efficiently apply network address translation (NAT).

Many ISPs have adopted carrier grade NAT (CGN) in an effort to address this shortage of public IPv4 addresses. CGN can be generally implemented in two different ways, namely IP_address-to-IP_address translation (conventional NAT or 1:1 NAT) and network address port translation (NAPT). Conventional NAT uniquely translates each private IP address to a public IP address. Under NAPT, however, each private IP address is translated to one or more ports of a public IP address.

There are various complications associated with these solutions where IPv4 addressing is concerned. For example, conventional NAT is not always practical for an ISP because the number of customers requiring private IPv4 addresses typically exceeds the number of public IPv4 addresses available to the ISP. This has led ISPs to offer static IPv4 addresses to customers at a premium cost. NAPT can be impractical because certain applications and hardware assume that a unique public IP address has been assigned, and often will not work properly. Furthermore, certain customers require inbound initiated access from the internet to home devices (e.g., computers, security cameras, etc.) while at work or abroad.

ISPs that implement CGN utilize NAT routers that will often block inbound NAPT traffic at the gateway, which is well before the user's home router. In order for the port to be maintained through to the server, a conventional NAT must be performed by the NAT router. Furthermore, in order to allow internet initiated traffic to work via IPv4 addressing for user applications, conventional NAT is required, and the NAT Router must support inbound initiated connections to the Public IPv4 NAT address.

Based on the foregoing, there is a need for an approach for supplying 1:1 NAT to certain users without the need for costly static IP addresses.

BRIEF SUMMARY

A method and system for providing a service to bypass carrier grade NAT (CGN) are described. According to an embodiment, the method includes generating a first range of private IP addresses for mapping to public IP addresses; generating a second range of private IP addresses for mapping to the public IP addresses; setting a status code for a terminal which facilitates communication between one or more devices and a public network, the status code being indicative of a predetermined status for the terminal; identifying a bypass device configured to access the public network through the terminal and requiring access to inbound traffic from the public network, if the status code is indicative of a bypass status; assigning a private IP subnet within the first range of private IP addresses to the terminal, if the status code is indicative of a bypass status; assigning a private IP address from the subnet of the first range of private IP addresses to the bypass device; mapping a public IP address to the private IP address assigned to the bypass device; and directing inbound traffic whose destination address matches the public IP address mapped to the private IP address of the bypass device to the terminal, if the status code is indicative of a bypass status.

According to another embodiment, the system includes a plurality of terminals, each terminal having one or more devices associated therewith, each terminal facilitating communication between the one or more devices and a public network, and each terminal being assigned status code indicative of a predetermined status therefor; a gateway configured to route traffic between the plurality of terminals and the public network, the gateway comprising: one or more first ports for transmitting/receiving data to/from the plurality of terminals; one or more second ports for transmitting/receiving data to/from the public network; and at least one processor configured to: generate a first range of private IP addresses for mapping to public IP addresses, generate a second range of private IP addresses for mapping to the public IP addresses, receive the status code of each terminal, and assign a private IP subnet within the first range of private IP addresses to selected terminals having a status code is indicative of a bypass status; wherein each terminal is configured to: identify a bypass device configured to access the public network through the terminal and requiring access to inbound traffic from the public network, if the status code is indicative of a bypass status, and assign a private IP address from the subnet of the first range of private IP addresses to the bypass device; and wherein the gateway is further configured to: map a public IP address to the private IP address assigned to the bypass device, and direct inbound traffic whose destination address matches the public IP address mapped to the private IP address of the bypass device to the terminal, if the status code is indicative of a bypass status.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A method and system for providing a service to bypass carrier grade NAT (CGN) are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
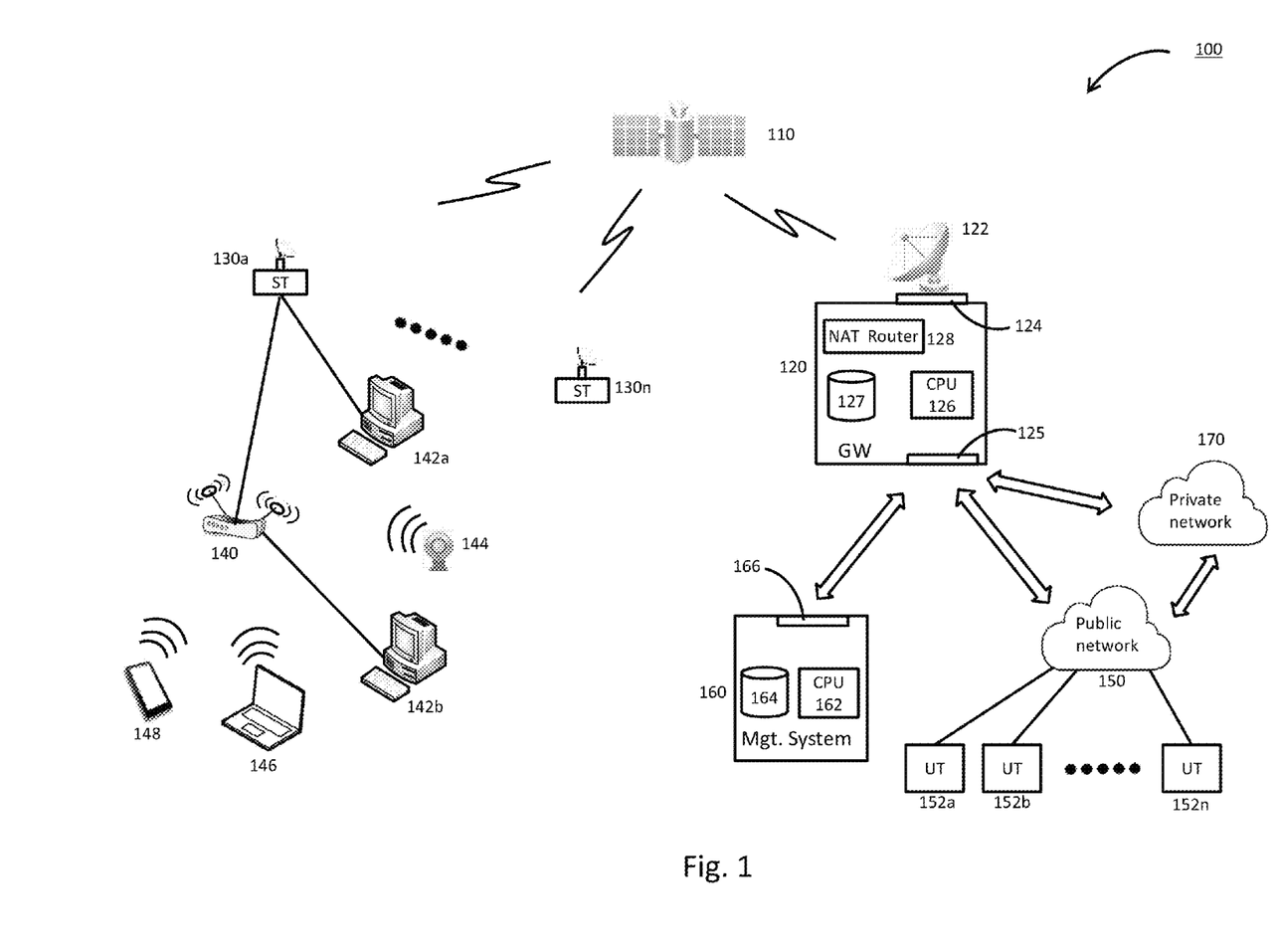
FIG. 1 is a diagram of a system capable of providing bypass for carrier grade NAT (CGN) in accordance with at least one embodiment.

FIG. 1 illustrates a system 200 capable of providing bypass for carrier grade NAT (CGN) in accordance with at least one embodiment. The system 200 illustrates communication between various types of networks including, for example, a satellite network, a private network, and a public network. According to the illustrated embodiment, a gateway 120 and satellite 110 are provided to facilitate communication between various CPEs (142-148), via the satellite terminal 130, and the external networks. The external networks can include, for example, a public network 150 (e.g., the Internet), a private network 160 (i.e., management system) of the ISP, or other private network 170. As used herein, the management system can be all, or part of, an ISP's private network. While FIG. 1 shows a single gateway 120, it should be appreciated that additional gateways may be provided at different points within the system 200. For example, the public network 150 can include one or more gateways. The management system 160 can also be part of a service provider network that includes one or more gateways.

In order to exchange information with the satellite 110, the gateway 120 can include a transmitter 122 which transmits/receives information to/from the satellite 110. The gateway 120 can further include one or more first ports 124 which can be assigned specific designations (or port numbers) for routing and/or prioritizing data along various backbones (or channels) of the satellite 110. A plurality of satellite terminals 130a-130n (or simply terminal) can be provided for communicating with the gateway 120 along a bent pipe path facilitated by the satellite 110. The satellite terminals 130 (or terminal) can be, for example, in the form of very small aperture terminals (VSAT) capable of transmitting/receiving information to/from the satellite 110.

According to the illustrated embodiment, each satellite terminal 130 can be connected to one or more CPE (142-148). The CPEs (142-148) can be in the form of various user devices capable of network communication using wired or wireless techniques. As illustrated in FIG. 1, for example, satellite terminal 130a has a wired connection to a router 140 and a personal computer 142a. The router 140 is configured with both wired and wireless capabilities. For example, the router 140 has wired connections to another personal computer 142a. The router also has wireless connections to a webcam 144, a laptop 146, and a tablet 148. According to various embodiments, wired communication can be achieved using physical Ethernet cables, USB cables, etc. Additionally, wireless communication can be achieved via standard wireless methods such as 802.11a/b/g/n/AC, Bluetooth, etc. The CPEs (142-148) can establish connections with the public network 150 and/or management system 160 in order to exchange information with various devices.

As illustrated in FIG. 1, the public network 150 also facilitates connection by various servers and/or user terminals 152a-152n. The user terminals (152) connected to the public network 150 can be in the form of servers, personal computers, laptops, tablets, mobile/smart phones, etc. The gateway 120 also includes one or more second ports 125 through which traffic can be exchanged with the public network 150 and the management system 160. Thus, a customer premise equipment 140 can establish connections with one or more user terminals 152 within the public network 150 via the satellite 110 and the gateway 120. The terminal 130 can also establish a connection with the management system 160 via the satellite 110 and the gateway 120. As further illustrated in FIG. 1, the management system 160 can include one or more processors 162 (also referred to as CPU, processing unit, etc.) that are configured to perform various processing tasks, including processing information pertaining to customer accounts, as well as other functions required by the service provider. The management system 160 also includes a storage unit 164 for maintaining account records for customers utilizing the satellite terminals 130, and the type/level of service to which the customers subscribe. Additionally, the management system 160 can include one or more ports 166 through which traffic can be exchanged with the gateway 120.

According one or more embodiments, the gateway 120 is configured to provide a bypass for carrier grade NAT (CGN) to a subset of customer who subscribe to the service. As previously discussed, CGN allows service providers to conserve public IPv4 addresses within their network while still assigning IPv4 addresses to customers who require access to devices capable of only supporting IPv4 addressing. The gateway 120 can include, at least in part, one or more processors (or CPUs) 126 that are configured to perform various processing tasks, including determining whether or not a satellite terminal 130 contains CPEs (142-148) that subscribe to the CGN bypass. The gateway 120 can include a NAT router 128 which performs different types of network address translations for routing traffic between CPEs (142-148) and the public network 150. According to at least one embodiment, the CPU 126 can be configured to perform some, or all, of the functions of the NAT router 128. The gateway 120 also includes a storage unit 127 for maintaining information to be used in performing various functions.

According to the illustrated embodiment, the gateway 120 facilitates traffic between the terminals 130 and the public network 150 and various user terminals connected to the public network. The gateway 120 also facilitates CGN bypass to terminals 130 that subscribe to the service. Upon initialization, the gateway 120 is configured to generate a first range of private IP addresses and a second range of private IP addresses. According to an embodiment, the first range of private IP addresses is allocated for terminals 130 that subscribe to the CGN bypass service for mapping selected bypass devices to public IP addresses. The second range of private IP addresses is allocated to terminals 130 that do not subscribe to the CGN bypass service for mapping associated CPES (142-148) to public IP addresses. According to another embodiment, the first range of IP addresses is separate from the second ranges of IP addresses. As used herein, the term "IP address" corresponds to an "IPv4" address, unless otherwise specified as an IPv6 address.

According to at least one embodiment, the gateway 120 can be further configured to set a status code for the terminal 130a in order to assign a status that is indicative of subscription to the CGN bypass service. For example, the gateway 120 can receive information from the management system 160 pertaining to the subscription status of various customers. This information can subsequently be transmitted to the terminals 130 in order to automatically configure various parameters necessary to successfully implement CGN bypass. According to further embodiments, the status of the terminal 130a can be set by an authorized technician who configures the terminal 130a when a customer initiates service. Furthermore, existing customers who subsequently change their service to include CGN bypass can schedule a service call during which an authorized technician can modify various parameters of the terminal 130a to support the service.

According to at least one embodiment, the terminal 130a can include a configuration menu that allows various parameters, including one specifying the CGN bypass, to be enabled or disabled. Thus, an authorized technician can access the configuration menu of the terminal 130a and select any necessary parameters. According to other embodiments, the management system 160 can transmit a configuration file that is pushed to the terminal 130a, and automatically executed in order to select and/or change any parameters commensurate with the subscriber's service plan. According to still further embodiments, a customer may be allowed to access some, or all, of the configuration settings within the terminal 130a to set the appropriate status for CGN bypass. During operation, however, the status of the terminal 130a can be validated by the gateway 120 in order to implement or reject any CGN bypass requests associated with the terminal 130a.

For example, the management system 160 can create, store, and update information pertaining to all customer status within the storage unit 164. This information can subsequently be transmitted to the gateway 120 in the form of a master file which can be used to confirm whether a customer has a valid subscription to the CGN bypass service. The gateway 120 could provide CGN bypass to terminals associated with customer accounts having a valid subscription. As illustrated in FIG. 1, the gateway 120 includes a NAT router 128 which can assist in performing the functions required to implement the CGN bypass service. According to various embodiments, however, the NAT router 128 can be configured to manage all aspects of the gateway 120 related to CGN bypass.

FIG. 1 further illustrates various CPEs (142-148) being connected to the terminal 130a. According to an exemplary embodiment, the subscriber only requires initiation of inbound access to the webcam 144 from the public network 150. Since only the webcam 144 requires CGN bypass service, the terminal 130a configuration can be accessed in order to identify the webcam 144 as the CPE which requires CGN bypass service. Additional embodiments, however, allow the subscriber select multiple CPEs (142-148) for accessing the CGN bypass service. According to at least one embodiment, the webcam 144 can be identified using its media access control (MAC) address. According to other embodiments, webcam can also be identified using predetermined and/or customized hostnames. For example, a hostname such as "mywebcam.com" can be predefined for the webcam 144 or independently set by the customer. Accordingly, such a hostname can be used to identify the webcam 144 to the terminal 130a.

According to additional embodiments, the router 140 can be selected as the bypass device. Such embodiments can allow multiple CPEs (142-148) to be connected to the router 144 in order to access the CGN bypass service. For example, the router configuration settings can be used to establish virtual IP addresses for the CPEs (142-148) and configure different port mapping rules for each individual CPE. Accordingly, public access to such CPEs (142-148) can be based, at least in part, on the IP address and port number assigned by the router 140.

Terminals 130 that subscribe to the CGN bypass service are assigned a private IP subnet within the first range of private IP addresses generated by the gateway 120. According to at least one embodiment, the terminal 130a can be further assigned an offset in conjunction with the private IP subnet. The terminal 130a then assigns private IP addresses from the subnet and/or offset to any CPEs (142-148) that require the CGN bypass service. According to at least one embodiment, the terminal 130a can also receive a private IP subnet within the second range of private IP addresses in order to assign private IP addresses to CPEs (142-148) which do not require the CGN bypass service. Additionally, terminals 130 that do not subscribe to the CGN bypass service, but are connected to CPEs (142-148) that only support IPv4 addressing can also receive a private IP subnet from the second range of private IP addresses.

Once the terminal 130a has provided IP addresses to all CPEs (142-148), this information can be exchanged with the gateway 120. This can be done, for example, during handshaking protocols. According to at least one embodiment, the gateway 120 utilizes information received from the terminal 130a, in part, to validate the terminal's status for receiving the CGN bypass service. For example, the status code of the terminal 130a can be compared to entries in the master list of customer subscriptions received from the management system 160 and stored within the gateway 120. According to further embodiments, the status code of the terminal 130a can be encrypted in a format capable of being decrypted at the gateway 120 without the need for a master list of customer subscriptions.

According to at least one embodiment, the gateway 120 maps a public IP address to each private IP address that has been assigned to bypass devices by the terminal 230a. As previously discussed, such functions can be handled by the CPU 126 and/or the NAT router 128. In the exemplary embodiment illustrated in FIG. 1, a public IP address would only be mapped to the webcam's private IP address. According to one or more embodiments, each public IP address is matched using a 1:1 NAT rule to the private IP address assigned to the bypass device. Accordingly, the public IP address remains static relative to the private IP address of the bypass device until the connection is terminated either manually by the gateway 120 or expires as the result of a timeout from the bypass device. Various embodiments, for example, can allow the NAT router 120 to set a timeout (e.g., 15 minutes) for how long to associate an idle private IPv4 address with a public IPv4 address.

Once the public IP address has been mapped to the private IP address of the bypass device, it can be registered with a dynamic domain name server (DNS) in order to allow inbound access from the public network 150 using a simpler and/or more conventional hostname. For example, the gateway 120, CPEs (142-148), and/or terminal 130a can initiate a dynamic DNS request to associate the public IP address of the bypass device with the associated hostname. When the subscriber desires access to the webcam 144, for example, the hostname "www.mywebcam.com" can be entered into a web browser or other dedicated application capable of providing access to the webcam 144. This initiates a query to a DNS which determines the public IP address associated with the hostname. The public IP address can then be used as the destination address in the request to access the webcam 144 from the internet.

When the request is received at the gateway 120, the 1:1 NAT rule is applied in order to identify the private IP address to which the public IP address was mapped. The gateway 120 then directs the inbound traffic to the terminal 130*a* connected to the bypass device which matches the private IP address. As previously discussed, the bypass device can also be in the form of a router. In such embodiments, the private IP address as well as the port number can be used to identify the correct CPE attached to the router.

As previously discussed, the bypass device is required to maintain an active connection while utilizing the public IP address. If the bypass device becomes idle for a period of time which exceeds the timeout period established by the NAT router 128, the public IP address can be unmapped from the private IP address of the bypass device and remapped to a completely different CPE. In order to reestablish connection, it is necessary to map the CPE to a new public IP address. According to at least one embodiment, the existing private IP address that has been assigned to the CPE would be mapped to the new public IP address if the terminal has not reassigned that particular private IP address to another CPE. According to further embodiments, if the terminal has assigned a new private IP address to the CPE, then the new private IP address is mapped to the new public IP address. Depending on availability, the new public IP address may differ from the public IP address previously assigned to the bypass device. Accordingly, the new public IP address must be updated at the DNS using another dynamic DNS request. At this point, the customer can again utilize the hostname to access the webcam 144.

If the terminal 130 does not subscribe to the CGN bypass service, however, the gateway 120 applies a 1:N NAT rule in order to map an available public IP address to the private IP address assigned to the non-bypass devices. While such a mapping can allow the non-bypass device to use a public IP address, it is dynamically assigned when the non-bypass device initiates an outbound connection requests to the gateway 120. The customer cannot initiate an inbound connection to the non-bypass device over IPv4. Rather, the customer can only respond directly to an outbound connection initiated by the non-bypass device. The response could include the dynamically assigned public IP address and/or port number of the non-bypass device initiating the connection. According to at least one embodiment, if the inbound traffic is not directed to a bypass device, or in response to an IP flow initiated by a non-bypass device, then the inbound traffic is dropped at either the gateway 120 or the terminal 130.

Figure 2:
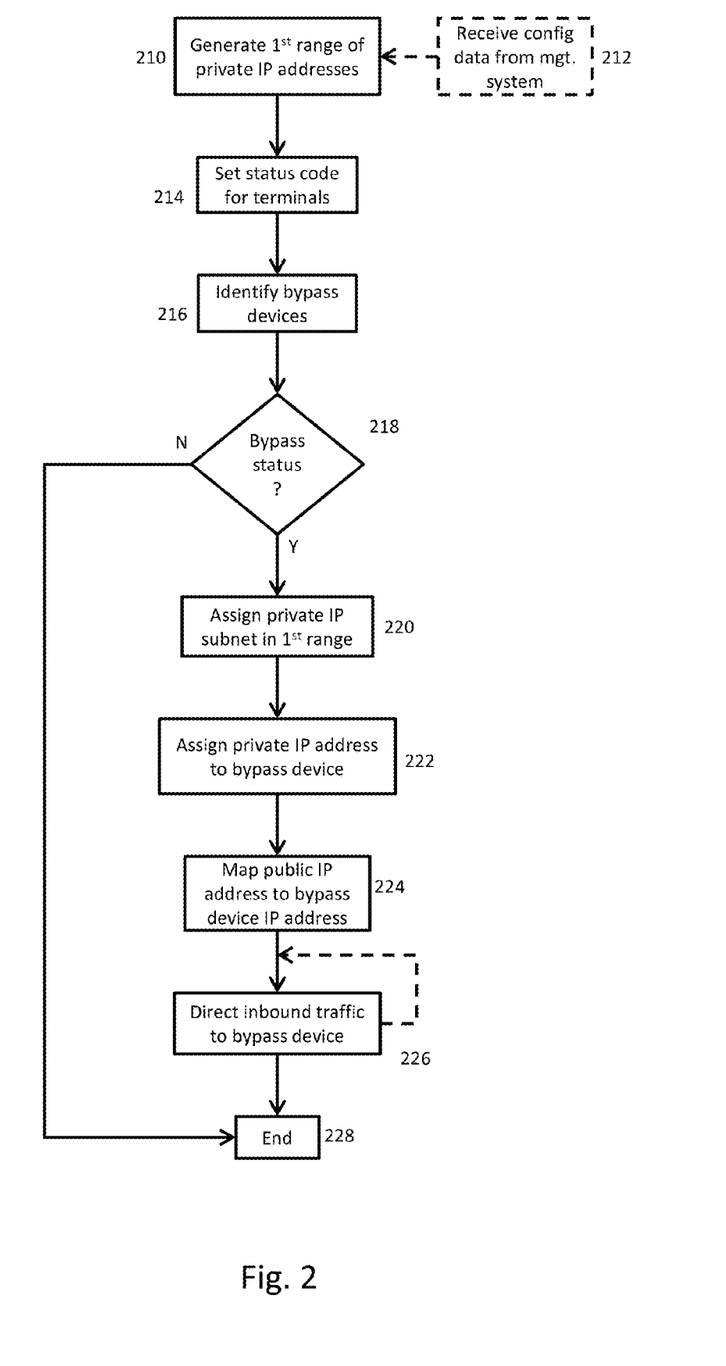
FIG. 2 is a flowchart of a process for providing bypass to CGN, according to one embodiment.

FIG. 2 is a flowchart of a process for providing bypass to CGN, according to one embodiment. At 210, a first range of private IP addresses is generated. As previously discussed, this can be done by the gateway as part of an initialization process. For example, the gateway can receive information from the management system which can be used for allocation of private IP addresses. This information can subsequently be used to generate the first range of private IP addresses. According to at least one embodiment, the gateway can dynamically receive configuration data and other information from the management system at 212. The configuration information can include, in part, the first range of private IP addresses after it has been generated by the management system. Thus, the gateway could use any information pertaining to IP addresses received from the management system rather than generating a new range of private IP addresses.

At 214, a status code is set for the terminals. According to one or more embodiments, the status code includes, at least in part, information which designates the type of service to which a customer has subscribed. According to at least one embodiment, the status code can be in the form of a file containing entries for various parameters capable of locking/unlocking various functions of the terminal. For example, if a particular customer desires to subscribe to the CGN bypass service, at least one parameter of the file would identify the customer's subscription status to the terminal. The information can also be in the form of an encrypted service parameter index that can be stored within the memory of the satellite terminal, and modified whenever an aspect of the customer's service changes.

At 216, bypass devices that are connected to the terminal are identified. As previously discussed, a bypass device can be in the form of any CPE which requires initial inbound access from the public network. For example, a customer can have a webcam capable of outputting a video feed of various portions of their home. The webcam can be part of the customer's wireless or wired home network, and thus easily accessible by other devices in the home. Such customers, however, may also desire to access the webcam while away from home, using the public network. Alternatively, a customer may have a personal computer, or other device, that they would like to access while away from their home. Thus, at 216, all such devices are identified to the terminal.

At 218, the bypass status of the terminal is determined. According to at least one embodiment, this can be accomplished during communication and/or handshaking between the terminal and the gateway. The gateway can check and/or validate the status code of the terminal in order to determine whether the customer has subscribed to the CGN bypass service. If it is determined that the customer terminal does not subscribe to the CGN bypass service, then control passes to 228, where the process ends. If it is determined that the terminal subscribes to the CGN bypass service, however, control passes to 220. A private IP subnet within the first range of private IP addresses is assigned to the terminal at 220. According to at least one embodiment, the gateway assigns the private IP subnet upon validating the bypass status of the terminal.

At 222, a private IP address is assigned to the bypass device. According to an embodiment, the terminal can be configured to implement a dynamic host configuration protocol (DHCP) which includes functions for assigning IP addresses and configuration information such as a default gateway, DNS server, etc. Depending on the specific embodiment, the IP address can be within a predetermined subnet and include an offset. The terminal can apply DHCP server functions to assign individual IP addresses to devices within the assigned private subnet plus any necessary offset. According to at least one embodiment, a webcam that is directly connected to the terminal and requires inbound access from the public network would be assigned a private IP address that is within the subnet of the first range of private IP addresses assigned to the terminal to ensure its receipt of 1:1 NAT. According to other embodiments, a webcam that is indirectly connected to the terminal (e.g., via a customer router) and requires inbound access from the public network would be statically port mapped such that inbound traffic to specific ports can be via the private IP address within the subnet.

At 224, a public IP address is mapped to the private IP address that has been assigned to the bypass device. As previously discussed, the public IP address corresponds to an IPv4 address. At 226, inbound traffic which contains the mapped public IP address is directed to the bypass device. The process subsequently ends at 228. As can be appreciated, network communications can be active for extended periods of time and require constant monitoring and processing. Accordingly, control can optionally return to 226 so that inbound traffic will continue to be directed to the bypass device.

Figure 3A:
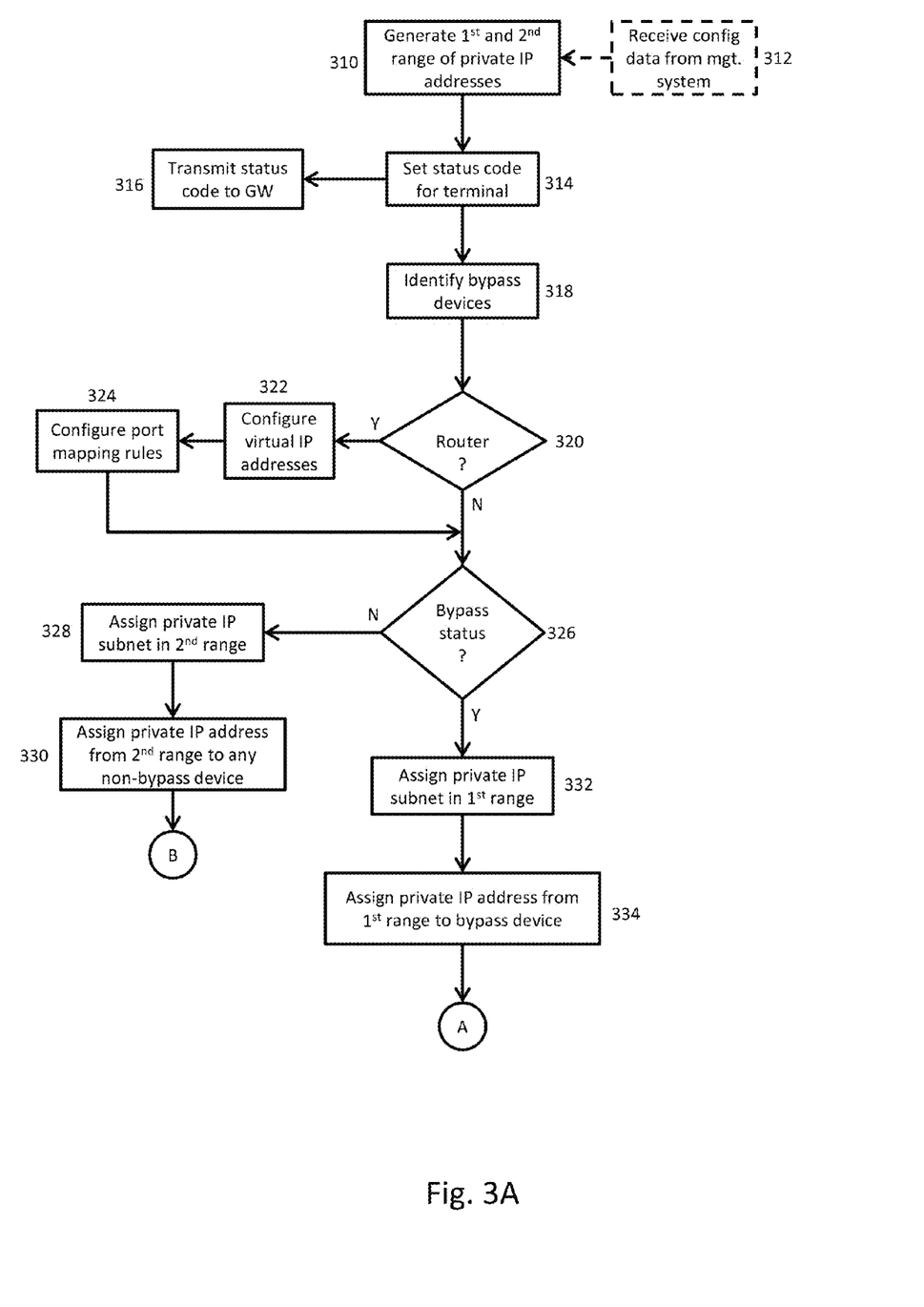
FIGS. 3A and 3B are a flowchart illustrating the steps performed to provide bypass for CGN, according to one embodiment.
Figure 3B:
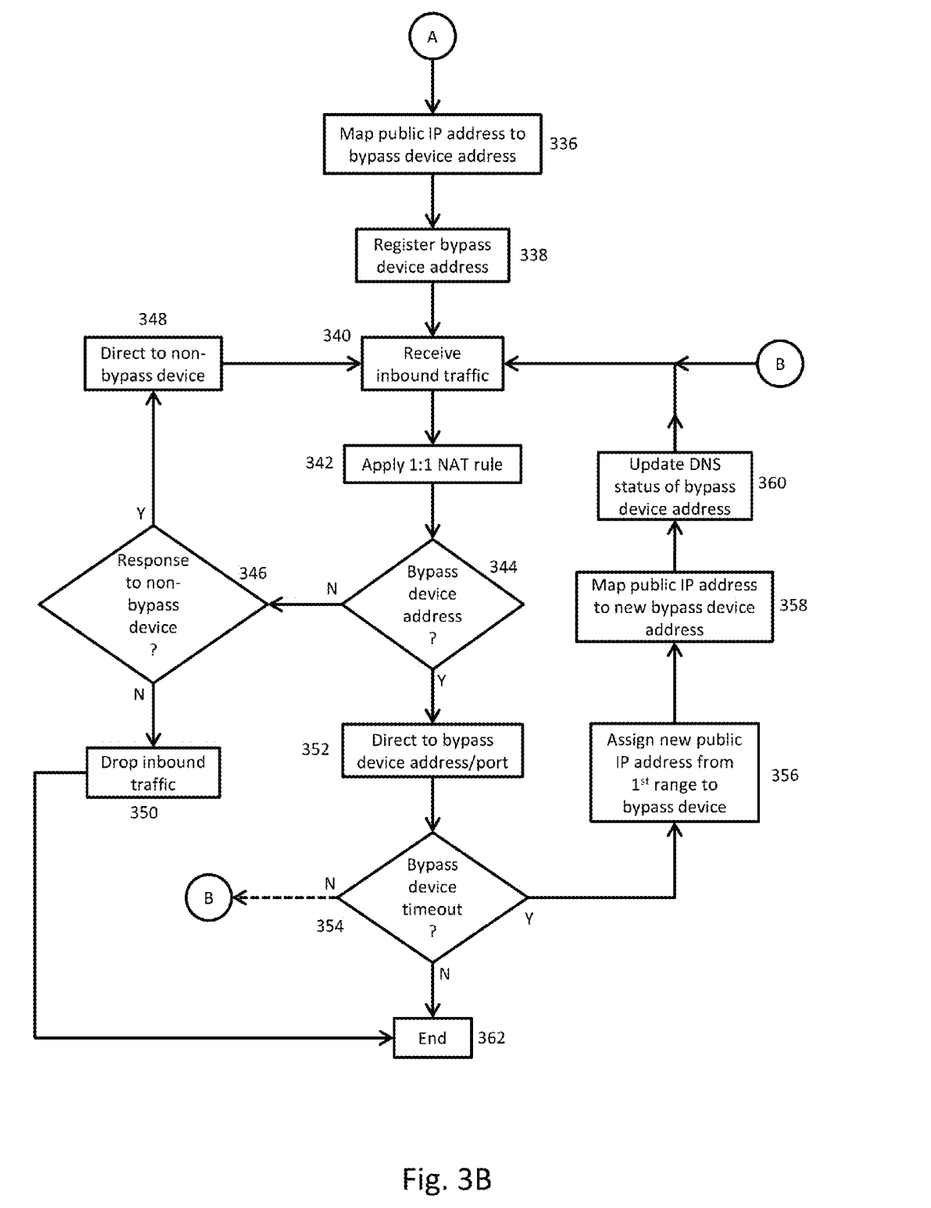

FIGS. 3A and 3B are a flowchart illustrating the steps performed to provide bypass for CGN, according to one or more embodiments. At 310, the gateway generates a first range of private IP addresses, and a second range of private IP addresses. According to an embodiment, the gateway can receive configuration data from the management system, as illustrated at 312. The configuration data can include, at least in part, the first range of private IP addresses, the second range of private IP addresses, a master list of customers who subscribe to the CGN bypass service, etc.

At 314, the status code of the terminal is set. As previously discussed, each terminal can receive information which is stored in memory, or other storage devices, to indicate the type of service to which the customer subscribes. According to various embodiments, rather than receiving information containing the status code, an authorized technician can manually set the status code for the terminal as part of a configuration process when service is initially provided. Furthermore, if a customer subsequently desires to terminate, or activate, services such as the bypass feature, the authorized technician can manually modify the terminal parameters to reflect the change in service. Alternatively, programming changes can be received directly from the management system to the terminal. At 316, the terminal transmits its status code to the gateway.

At 318, one or more bypass devices are identified. According to at least one embodiment, a customer can access certain configuration parameters within the terminal in order to provide some identification information for any particular device which requires initial inbound access from the public network. At 320, it is determined whether the bypass device is a router. If the bypass device is a router, then control passes to 322 where virtual IP addresses are assigned to equipment attached to the router. At 324, various port mapping rules are configured for the CPEs attached to the router. Control then passes to 326. If the bypass device is not a router, then the bypass status of the terminal is validated at 326. According to at least one embodiment, the bypass status of the terminal can be validated comparing its status code to the master list of customer status codes received from the management system. According to further embodiment, the gateway can be configured to parse and/or decrypt the status code received from the terminal in order to independently determine whether a bypass status has been authorized for the terminal.

If the terminal does not have any bypass status, then at 328, the gateway assigns a private IP subnet from the second range of private IP addresses to the terminal. At 330, the terminal assigns a private IP address from the second range of private IP addresses to CPEs, and these CPEs will be non-bypass devices. Control then passes to 340. If the bypass status of the terminal is validated, then the gateway assigns a private IP subnet from the first range of private IP addresses along with any offset to the terminal at 332. At 334, the terminal assigns a private IP address to the bypass device. According to various embodiments, an offset can generated to correspond with the number of bypass devices. The terminal then assigns the private IP to the bypass device from the assigned subnet within the first range of private IP addresses and in accordance with the offset. For example, an offset of k can be used to provide private IP addresses to k bypass devices. It should be noted, however, that the use of an offset is only one way of allocating IP addresses from the subnet to a desired number of bypass devices. Various other techniques can be used to assign private IP address to the bypass devices.

According to at least one embodiment, the bypass device can be embodied as a router (or similar device) capable of providing access to multiple CPEs (e.g., computers, laptops, tablets, webcams, etc.). Thus, the actual bypass device (or devices) requiring inbound access can be one or more webcams, computers, etc. According to such embodiments, the router can apply port mapping to the bypass devices, thereby actually using only one IP address from the first range of private addresses. As can be appreciated, a terminal which supports a bypass device may also support non-bypass devices. According to further embodiments, the terminal may further assign IP addresses to the non-bypass devices from the assigned subnet within the first range of IP addresses. Thus, the private IP subnet assigned to the terminal within the first range of IP addresses can be used to support both bypass and non-bypass devices.

Referring to FIG. 3B, the gateway maps a public IP address to the private IP address which has been assigned to the bypass device at 336. At 338, the public IP address of the bypass device is registered. According to at least one embodiment, the terminal and/or CPEs can perform a dynamic DNS request to register the public IP address that is mapped to the bypass device. Thus, in order to initiate inbound access to the bypass device from the public network, a domain DNS query can be submitted with the hostname in order to generate a request for the IP address. At, inbound traffic is received at the gateway. At 342, a 1:1 NAT rule is applied by the gateway in order to identify the private IP address to which the public IP address has been mapped. According to various embodiments, the gateway can include a NAT router configured, in part, to perform network address translations of inbound and/or outbound traffic. Thus, the 1:1 NAT rule could optionally be applied by the NAT router.

At 344, the gateway determines whether the resulting private IP address corresponds to that of a bypass device. If the resulting private IP address does not belong to a bypass device, then control passes to 346. The gateway examines the inbound traffic to determine whether it is received in response to an IP flow (or network communication) initiated by a non-bypass device. If the inbound traffic is in response to an IP flow and/or request from a non-bypass device, then the inbound traffic is directed to the non-bypass device at 348 based on the source address/port supplied by the non-bypass device. Control then returns to 340 where inbound traffic continues to be received. If the inbound traffic is not in response to an IP flow (or network communication) initiated by a non-bypass device, then the packets are dropped at 350. According to at least one embodiment, the packets can be dropped at the gateway or NAT router.

If the translated private address corresponds to that of a bypass device, then the inbound traffic is directed to the bypass devices address and/or port number at 352. At 354, the status of the bypass device is checked to determine if a predetermined timeout period has been reached. According to one or more embodiments, the timeout period can be set by the gateway and/or NAT router. According to further embodiments, the DHCP address lease may expire if the bypass device remains idle for an extended period of time. Thus, if a new communication session is initiated, the previous public IP address may not be available to the customer, or the DHCP lease on the private IP address may have been renewed. If it is determined that the timeout period for the bypass device has been exceeded, then a new private IP address from the first range of private IP addresses is assigned to the bypass device at 356. At 358, a new public IP address is mapped to the private IP address of the bypass device. At 360, the DNS status of the bypass devices address is updated. As previously discussed, this can be done by performing a dynamic DNS request to update the new public IP address and/or hostname that has been mapped to the bypass device. Control then returns to 340 where inbound traffic continues to be received. If the bypass devices timeout period has not been reached, control passes to 362 where the process ends. Optionally, control can return to 340 where inbound traffic continues to be received.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 4:
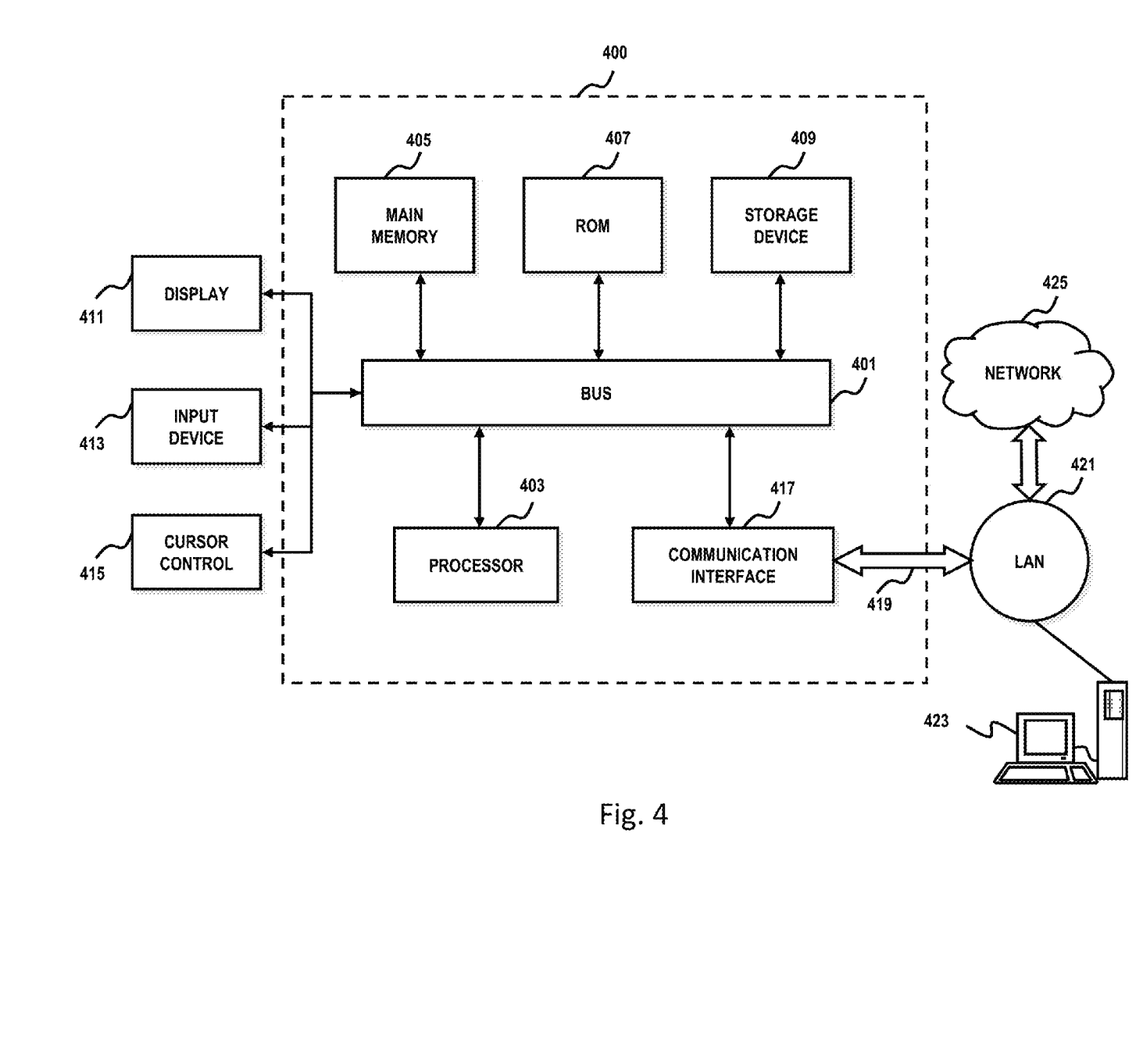
FIG. 4 is a diagram of a computer system that can be used to implement various exemplary embodiments.

FIG. 4 is a diagram of a computer system that can be used to implement various embodiments. The computer system 400 includes a bus 401 or other communication mechanism for communicating information and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a light emitting diode (LED) or other flat panel displays, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411. Additionally, the display 411 can be touch enabled (i.e., capacitive or resistive) in order facilitate user input via touch or gestures.

According to an exemplary embodiment, the processes described herein are performed by the computer system 400, in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multiprocessing arrangement may also be employed to execute the instructions contained in main memory 405. In alternative embodiments, hard-wired circuitry may be used in place of or in combination with software instructions to implement exemplary embodiments. Thus, exemplary embodiments are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a High Definition Multimedia Interface (HDMI), etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 such as a wide area network (WAN) or the Internet. The local network 421 and the network 425 both use electrical, electromagnetic, or optical signals to convey information and instructions. The signals through the various networks and the signals on the network link 419 and through the communication interface 417, which communicate digital data with the computer system 400, are exemplary forms of carrier waves bearing the information and instructions.

The computer system 400 can send messages and receive data, including program code, through the network(s), the network link 419, and the communication interface 417. In the Internet example, a server (not shown) might transmit requested code belonging to an application program for implementing an exemplary embodiment through the network 425, the local network 421 and the communication interface 417. The processor 403 may execute the transmitted code while being received and/or store the code in the storage device 409, or other non-volatile storage for later execution. In this manner, the computer system 400 may obtain application code in the form of a carrier wave.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as the storage device 409. Non-volatile media can further include flash drives, USB drives, microSD cards, etc. Volatile media include dynamic memory, such as main memory 405. Transmission media include coaxial cables, copper wire and fiber optics, including the wires that comprise the bus 401. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 5:
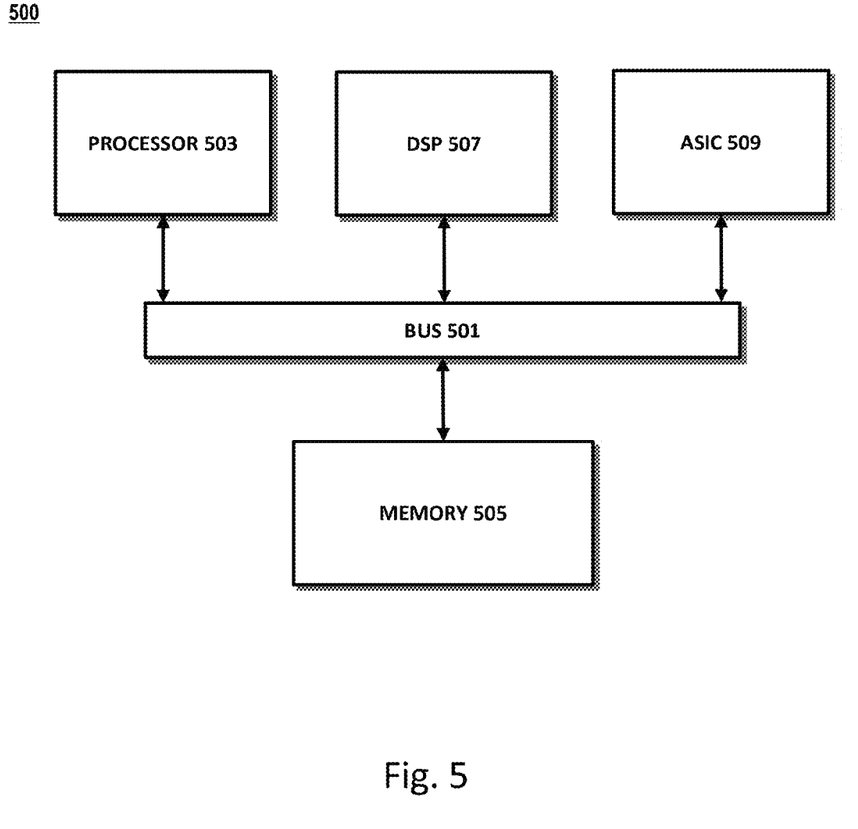
FIG. 5 is a diagram of a chip set that can be used to implement various exemplary embodiments.

FIG. 5 illustrates a chip set 500 upon which an embodiment of the invention may be implemented. Chip set 500 is programmed to implement various features as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 500, or a portion thereof, constitutes a means for performing one or more steps of the figures.

In one embodiment, the chip set 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 503 and accompanying components have connectivity to the memory 505 via the bus 501. The memory 505 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 505 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   generating a first range of private internet protocol (IP) addresses for mapping to public IP addresses;
   generating a second range of private IP addresses for mapping to the public IP addresses;
   setting a status code for a terminal which facilitates communication between one or more devices and a public network, the status code being indicative of a predetermined status for the terminal;
   identifying a bypass device configured to access the public network through the terminal and requiring access to inbound traffic from the public network, if the status code is indicative of a bypass status;
   assigning a private IP subnet within the first range of private IP addresses to the terminal, if the status code is indicative of a bypass status;
   assigning a private IP address from the subnet of the first range of private IP addresses to the bypass device;
   mapping a public IP address to the private IP address assigned to the bypass device; and
   directing inbound traffic whose destination address matches the public IP address mapped to the private IP address of the bypass device to the terminal, if the status code is indicative of a bypass status.

2. The method of claim 1, further comprising validating the status code assigned to the terminal using a master list of active status codes.

3. The method of claim 1, wherein the bypass device is identified using at least one of a media access control (MAC) address and a host name assigned thereto.

4. The method of claim 1, wherein the bypass device is a router, and further comprising:
   configuring virtual IP addresses for devices connected to the router; and
   configuring port mapping rules between the devices connected to the router and the terminal.

5. The method of claim 1, wherein:
   the first range of private IP addresses supports 1:1 mapping with public IP addresses; and
   the second range of private IP addresses supports 1:N mapping with public IP addresses.

6. The method of claim 5, wherein the status code is indicative of non-bypass status, and further comprising:
   assigning a private IP subnet within the second range of private IP addresses to the terminal;
   assigning a private IP address within the subnet of the second range of private IP addresses to each of the one or more devices; and
   mapping an available public IP address to the private IP address assigned to each device.

7. The method of claim 6, further comprising directing inbound traffic whose destination address matches the public IP address mapped to the private IP address of a particular device to the terminal, only in response to outbound traffic initiated by the particular device.

8. The method of claim 1, wherein:
   the terminal performs a dynamic domain name server (DNS) request to achieve at least one of registering the public IP address mapped to a bypass device, updating the public IP address mapped to a bypass device, registering a hostname mapped to a bypass device, and updating a hostname mapped to a bypass device; and
   the public IP address or hostname of the bypass device is obtainable from a DNS query.

9. The method of claim 1, wherein directing inbound traffic comprises applying a 1:1 network address translation rule to map at least one of the public IP address and port number of the inbound traffic to at least one of the private IP address and port number assigned to the bypass device.

10. The method of claim 1, wherein the bypass device exceeds a predetermined idle time period, and further comprising:
assigning a new private IP address from the subnet of the first range of private IP addresses to the bypass device;
mapping a new public IP address to the new private IP address assigned to the bypass device; and
performing a dynamic DNS request to achieve at least one of registering the new public IP address mapped to a bypass device, updating the new public IP address mapped to a bypass device, registering a new hostname mapped to a bypass device, and updating a new hostname mapped to a bypass device.

11. A system comprising:
a plurality of terminals, each terminal having one or more devices associated therewith, each terminal facilitating communication between the one or more devices and a public network, and each terminal being assigned status code indicative of a predetermined status therefor;
a gateway configured to route traffic between the plurality of terminals and the public network, the gateway comprising:
one or more first ports for at least one of transmitting to and receiving from the plurality of terminals,
one or more second ports for transmitting/receiving data to/from the public network; and
at least one processor configured to:
generate a first range of private internet protocol (IP) addresses for mapping to public IP addresses,
generate a second range of private IP addresses for mapping to the public IP addresses,
receive the status code of each terminal, and
assign a private IP subnet within the first range of private IP addresses to selected terminals having a status code is indicative of a bypass status,
wherein each terminal is configured to:
identify a bypass device configured to access the public network through the terminal and requiring access to inbound traffic from the public network, if the status code is indicative of a bypass status, and
assign a private IP address from the subnet of the first range of private IP addresses to the bypass device, and
wherein the gateway is further configured to:
map a public IP address to the private IP address assigned to the bypass device, and
direct inbound traffic whose destination address matches the public IP address mapped to the private IP address of the bypass device to the terminal, if the status code is indicative of a bypass status.

12. The system of claim 11, wherein:
the gateway is configured to receive a master list of active status codes for the plurality of terminals; and
the at least one processor is further configured to validate the status code assigned to the plurality of terminals based, at least in part, on the received master list of active status codes.

13. The system of claim 11, wherein the terminal is further configured to identify the bypass device using at least one of a media access control (MAC) address and a host name.

14. The system of claim 11, wherein:
the bypass device is a router; and
the router is configured to generate virtual IP addresses for devices connected thereto, and generate port mapping rules between the devices connected thereto and the terminal.

15. The system of claim 11, wherein:
the first range of private IP addresses supports 1:1 mapping with public IP addresses; and
the second range of private IP addresses supports 1:N mapping with public IP addresses.

16. The system of claim 15, wherein:
the status code of a selected is indicative of non-bypass status, and the at least one processor is further configured to assign a private IP subnet within the second range of private IP addresses to the selected terminal;
the selected terminal is further configured to assign a private IP address within the subnet of the second range of private IP addresses to each of the one or more devices; and
the gateway is further configured to map an available public IP address to the private IP address assigned to each device.

17. The system of claim 16, wherein the gateway is further configured to direct inbound traffic whose destination address matches the public IP address mapped to the private IP address of a particular device to the terminal, only in response to outbound traffic initiated by the particular device.

18. The system of claim 15, wherein:
the terminal is configured to perform a dynamic domain name server (DNS) request to achieve at least one of registering the public IP address mapped to a bypass device, updating the public IP address mapped to a bypass device, registering the hostname mapped to a bypass device, and updating the hostname mapped to a bypass device; and
the public IP address or hostname of the bypass device is obtainable from a DNS query.

19. The system of claim 15, wherein the gateway further comprises a network address translator configured to direct inbound traffic by applying a 1:1 network address translation rule to map at least one of the public IP address and port number of the inbound traffic to at least one of the private IP address and port number assigned to the bypass device.

20. The system of claim 11, wherein:
the terminal is configured to assign a new private IP address from the subnet of the first range of private IP addresses to the bypass device, if a predetermined idle time has been exceeded by the bypass terminal;
the gateway is configured to map a new public IP address to the new private IP address assigned to the bypass device; and
the terminal is further configured to perform a dynamic DNS request to achieve at least one of registering the new public IP address mapped to a bypass device, updating the new public IP address mapped to a bypass device, registering a new hostname mapped to a bypass device, and updating a new hostname mapped to a bypass device.

* * * * *